United States Patent [19]

Stone, Jr.

[11] Patent Number: 4,622,230

[45] Date of Patent: Nov. 11, 1986

[54] DISPLACEMENT TYPE COFFEE MAKER

[75] Inventor: Wayne B. Stone, Jr., Bethesda, Md.

[73] Assignee: Wood Manufacturing Co., Inc., Flippin, Ark.

[21] Appl. No.: 734,210

[22] Filed: May 15, 1985

[51] Int. Cl.$^4$ ............................................. A47J 31/00
[52] U.S. Cl. ..................................... 426/433; 99/295; 99/304
[58] Field of Search ............... 99/300, 301, 304, 305, 99/307, 316, 295, 306, 279, 283, 194, 297, 298, 299, 302 P, 301 R, 287; 426/433

[56] References Cited

U.S. PATENT DOCUMENTS

| | | | |
|---|---|---|---|
| 2,786,408 | 3/1957 | Herrera | 99/300 |
| 3,320,073 | 5/1967 | Bixby | 99/304 |
| 3,336,856 | 8/1967 | Martin | 99/300 |
| 3,589,271 | 6/1971 | Tarrant | 99/305 |
| 3,740,231 | 6/1973 | Drwal et al. | 426/433 |

*Primary Examiner*—Robert W. Jenkins
*Attorney, Agent, or Firm*—Banner, Birch, McKie & Beckett

[57] ABSTRACT

A siphon of preheated water to a filter basket is initiated by an inpour of cold water to a buoyant tank floating in a holding tank on the preheated water. The cold water addition causes the buoyant tank to sink thus raising the level of the preheated water to start a siphon. The cold water is thereafter metered to the holding tank and preheated preparatory to initiating another brew cycle.

12 Claims, 8 Drawing Figures

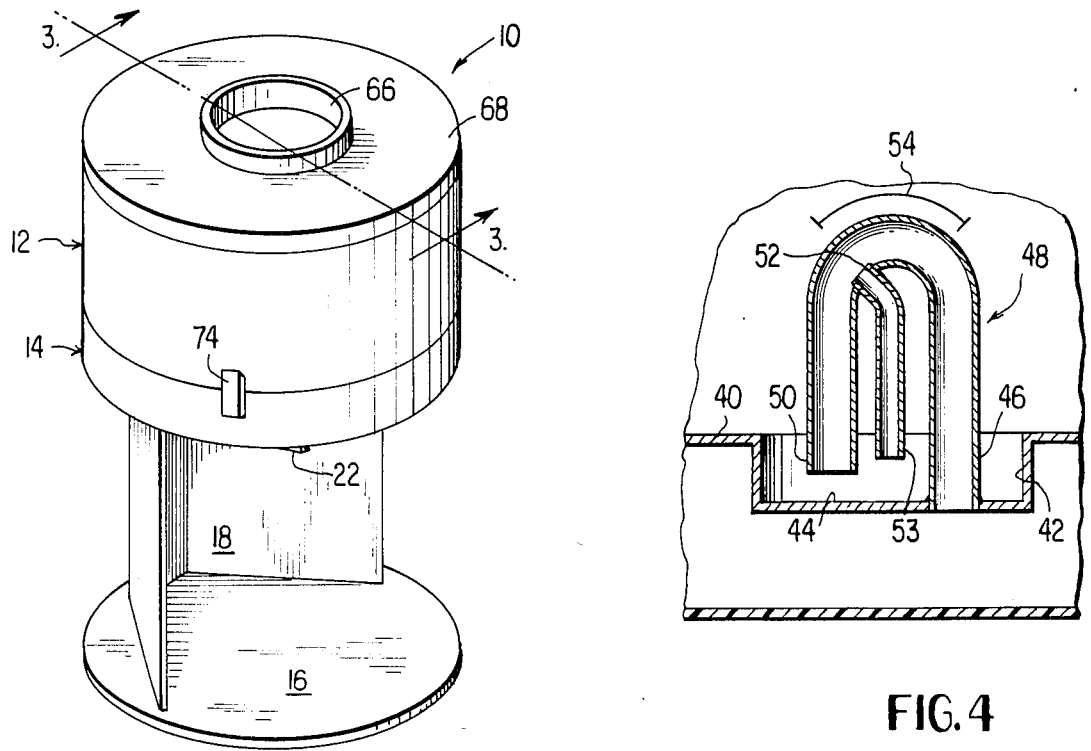
FIG. 1
FIG. 4
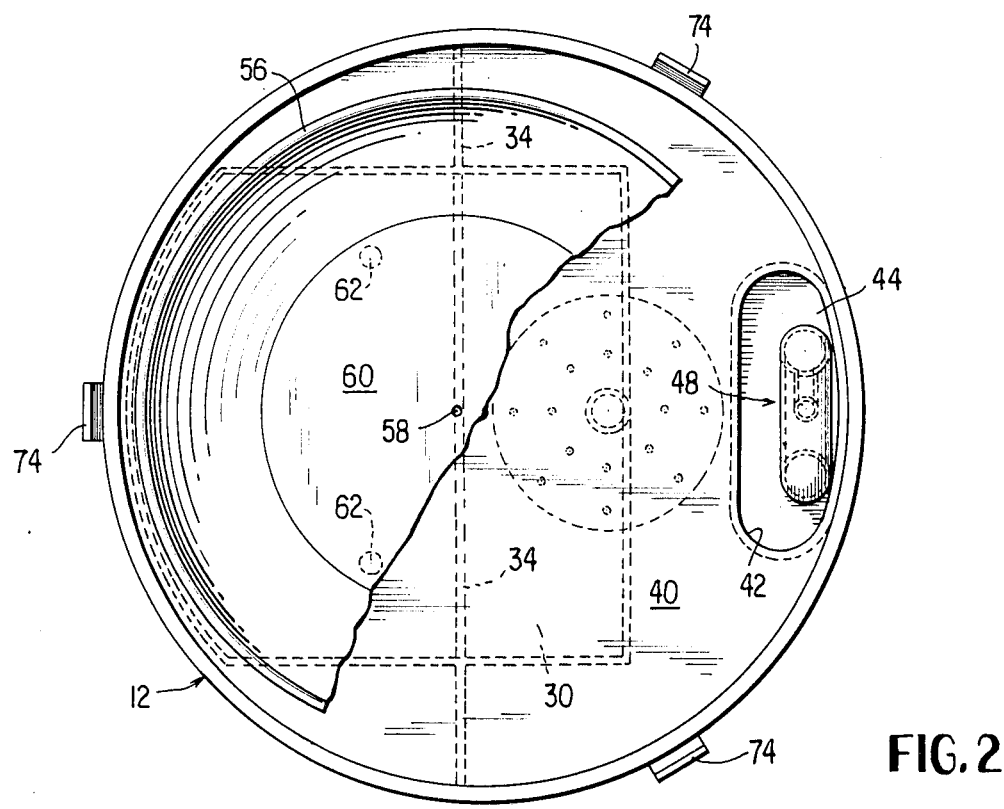
FIG. 2

DISPLACEMENT TYPE COFFEE MAKER

BACKGROUND OF THE INVENTION

The minimum time in which a full carafe of coffee (one-half gallon) can be made in an automatic drip coffee maker is two and one-half minutes. Any faster flow rate through the coffee grounds results in incomplete extraction. In order to make coffee in this minimum time, it is necessary that the water be preheated and held at correct brewing temperature (approximately 200° F.) until such time as the brewing cycle is to be commenced.

All present day coffee makers, which utilize preheated water, operate on the same principle: That of cold water displacement of preheated water. More specifically, a large quantity of water is preheated by immersion heaters and thermostatically maintained at correct brewing temperature by an immersion thermostat. To make coffee, a quantity of cold water is introduced, via a holding pan and inlet tube, to the bottom of the preheated water whereupon an equal quantity of the preheated water is displaced from the top thereof, via an outlet tube, to flow to an underlying filter basket.

The quantity of preheated water is necessarily large as compared with the quantity of cold water to be added to the bottom of the preheated water to insure that the displaced, preheated water is not cooled by the cold water addition. Typically, the ratio of preheated water to cold water addition is 3:1. The capacity of the preheat water tank would thus be one and one-half gallons, while that of the holding pan is one-half gallon. The total required water capacity that must be accomodated within the appliance housing is, then, two gallons.

This type coffee maker, when new, has two distinct advantages over other automatic drip coffee makers; speed and brew quality. An unusually large filter basket is typically employed and the hot water is introduced at such a rate that the coffee grounds are literally floated in a large quantity of hot water. The inpour rate to the filter basket and the outflow rate therefrom (as metered by the size of the inflow and outflow openings) is such as to assure that the hot water/coffee suspension is just short of overflowing the filter basket until all the hot water has been introduced. The key to the superior coffee quality is that the initial brewing contact is between a large body of water at correct brewing temperature and all of the coffee grounds. A flow-through time of approximately two and one-half minutes is obtainable with this type coffee maker.

The purposes of the present invention are to achieve the brew quality and brew time advantages mentioned above in a much smaller appliance profile requiring only that one-half gallon of water be preheated; to eliminate the use of small bore tubing and its attendant liming problems and to remove from water contact the necessary heating element and thermostatic control.

SUMMARY OF THE INVENTION

One-half gallon of preheated water is maintained in a water holding tank and a buoyant, bowl-shaped transfer tank having a small opening in the bottom, is floated on the preheated water. One leg of a large diameter, U-shaped siphon tube extends through the bottom of the water holding tank and communicates with a metering tank and spray head overlying a coffee filter basket. The other, inlet end of the tube terminates inside the water holding tank adjacent the bottom. The bight of the U-shaped siphon tube is above the level of the preheated water.

To commence a brewing cycle, one-half gallon of cold water is poured into the buoyant transfer tank which then sinks into the preheated water to raise the preheated water level above the bight of the siphon tube. The preheated water is then quickly siphoned to the metering tank and spray head. A novel siphon cutoff totally empties the siphon tube when the descending, preheated water level reaches the inlet end of the siphon.

The cold water in the buoyant transfer tank, which is now resting on the floor of the holding tank, slowly trickles through the small opening in the bottom of the transfer tank to refill the holding tank and refloat the emptying transfer tank readying the coffee maker for another brew cycle.

DESCRIPTION OF THE DRAWINGS

FIG. 1 is a perspective view of the present coffee maker;

FIG. 2 is a top plan view thereof with the cover removed and a portion of the buoyant transfer tank broken away;

FIG. 4 is a longitudinal section illustrating the siphon and siphon cut-off;

FIGS. 2–4 are to half scale.

DESCRIPTION OF THE PREFERRED EMBODIMENT

In FIG. 1 is illustrated a coffee maker 10 having a water holding tank 12 removably supported above a transfer tank assembly 14 which is supported in spaced overlying relation to a coffee pot support surface 16 adapted to incorporate a "keep warm" heater (not shown) via an integral support column 18.

Figure 3:
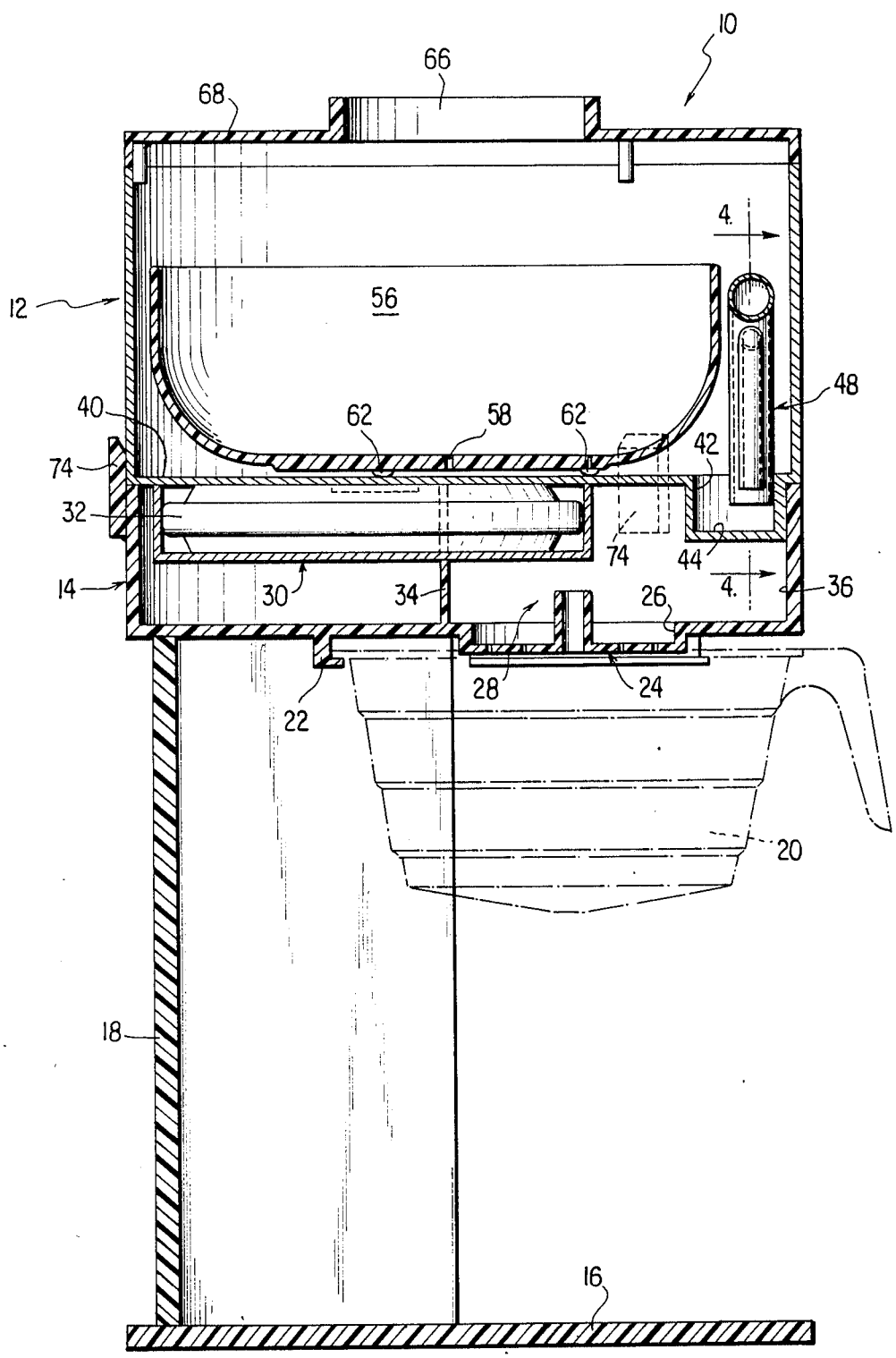
FIG. 3 is a longitudinal section taken along line 3—3 of FIG. 1.

A filter basket 20 (FIG. 3) is adapted to be supported via support tracks 22 beneath a spray head 24 comprising a perforated, recessed portion 26 in the base of transfer tank assembly 14. The transfer tank per se, (i.e. the water holding and transfer portion of the transfer tank assembly) is indicated by reference character 28 and partially underlies a heater element compartment 30 in which is supported a thermostatically controlled heater element 32 adapted to heat and maintain water in holding tank 12 at a desired, predetermined temperature. The electrical connections and controls for heater 32 have been omitted from the drawings however a detailed description of the thermostatically controlled heater (known as an EGO Fischer) and the electrical connections therefor are fully detailed in applicant's copending application Serial No. 650,599 filed Sept. 14, 1984.

The transfer tank 28 is delimited by vertical walls 34 and peripheral wall 36 comprising approximately 180° of the surrounding transfer tank assembly wall. Compartment 30 in transfer tank assembly 14 is water tight with respect to transfer tank 28 and accomodates the wiring connections to heater 32.

The base 40 of holding tank 12 is formed with a well 42 through the base 44 of which the longer leg 46 of a U-shaped siphon tube 48 extends. (See FIG. 4). The shorter, inlet leg 50 terminates below the level of base 40 and above the floor of the well. The upper end of a siphon breaker tube 52 is in open communication with siphon tube 48 adjacent the bight 54 thereof and the lower end 53 is below the level of base 40 but above the inlet end of leg 50.

The specific siphon and siphon breaker combination shown in FIG. 4 is an important aspect of the invention insofar as consistency of long term operation is concerned. Prior art coffee makers that employed a siphon have been plagued by the inconsistency of "cut off", i.e. a definite, clean cut off with no leakage after cut off. For example, if the siphon tube 48 of FIG. 4 be used without the cut off, or siphon breaker, tube 52 to siphon water from tank 12; as the lowering water level reaches the open, inlet end 50, the rapid siphon flow out of the outlet leg 46 ceases but both legs remain partially filled with water. The shorter leg is just in contact with the lowered water level while the longer leg still contains a column of water with an air bubble adjacent the bight and temporarily trapped there until gravity ultimately overcomes the partial vacuume created in the bight. In accordance with the principles of the present invention additional water is quickly added to holding tank 12 therefore, the siphon could be restarted upon the new water addition if the siphon cut off is not such as to completely void the siphon tube of water immediately upon the water level in tank 12 reaching the lower end of siphon inlet leg 50.

The presence of the siphon breaker tube 52 in combination with the siphon assembly mounting in well 42 produces an immediate voiding of all water in the siphon. The explanation is as follows:

Once a siphon is started in siphon tube 48 (as in FIG. 7), the water level in tank 12 drops rapidly due to the large diameter of the siphon tube. Once the descending water level enters well 42 the rate at which the level lowers is extremely fast due to the small volume of the well so that the lowering water level quickly recedes well below the lower end 53 of the siphon breaker tube. When the receding water level then reaches the inlet end 50 of the siphon, the bubble that tends to remain in the bight of the siphon is vented via the siphon breaker 52 and both siphon legs 50 and 46 drain instantly for an instantaneous cut off.

A buoyant water transfer tank 56 having a small metering hole 58 in the base 60 thereof is freely contained in holding tank 12. Buoyant tank 56 may be made of plastic having a specific gravity of less than 1, such as polypropylene; it could be formed as a hollow structure or it could be made of wood or any other buoyant material. Alternatively, the buoyancy could be imparted by the addition of floats, such as closed cell foam. Three small metal feet 62 are secured to the underside of tank base 60 so that the same does not rest flush against the base 40 of holding tank 12.

Figure 5:
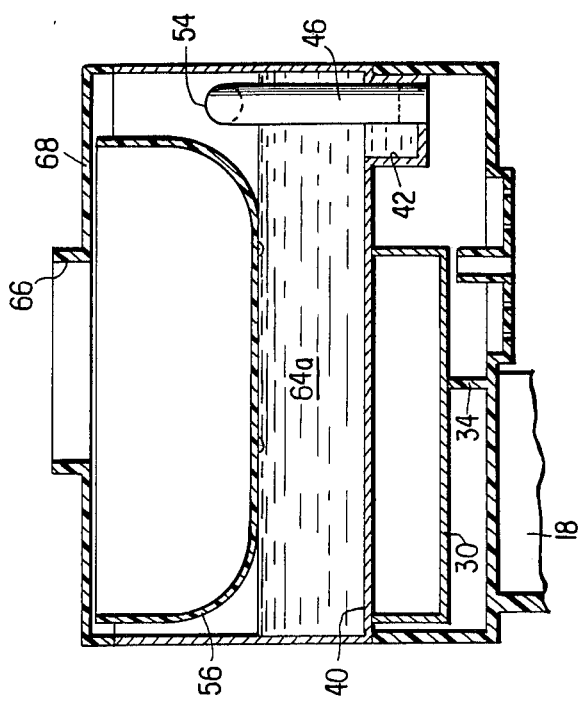
FIGS. 5–8 are diagrammatic illustrations of the cyclic operational steps in coffee brewing and preheat cycles.
Figure 6:
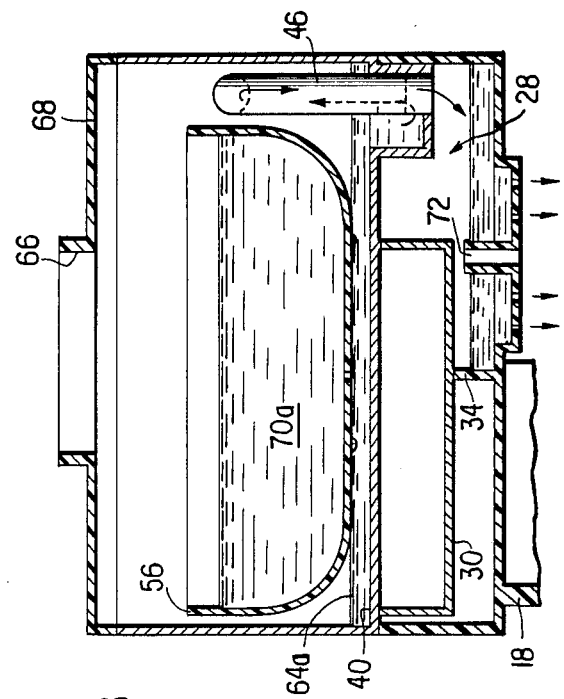

With reference to FIGS. 5-8; FIG. 5 depicts an initial inpour 64 of cold water through opening 66 in cover 68 contemporaneously with the actuation of heater 32. After approximately five minutes, this first body of water 64a has passed through opening 58 and floats the now empty buoyant transfer tank 56 thereon as shown in FIG. 6. Note that the upper level of water 64a is just below the bight 54 of the siphon tube. During this period of time the body of water 64a is heated and thermostatically maintained at approximately 200° F. by heater 32. The coffee maker is now ready for a first brew cycle.

Figure 7:
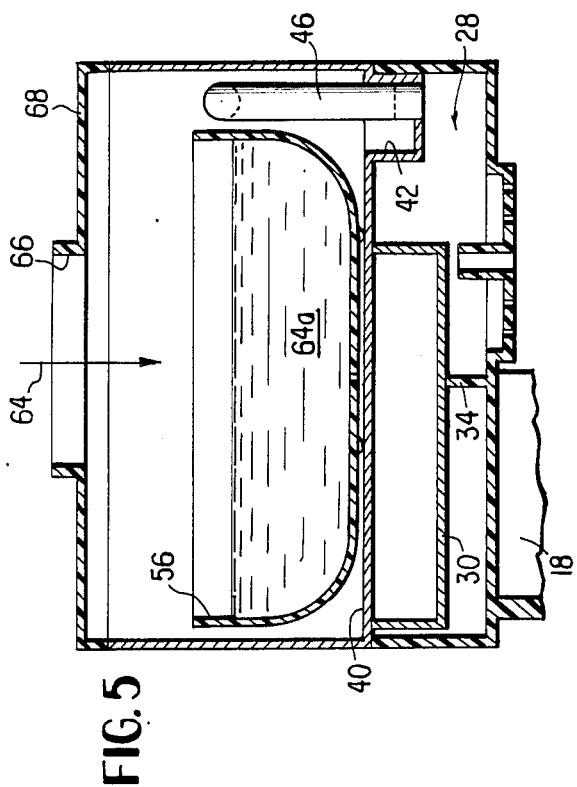
Figure 8:
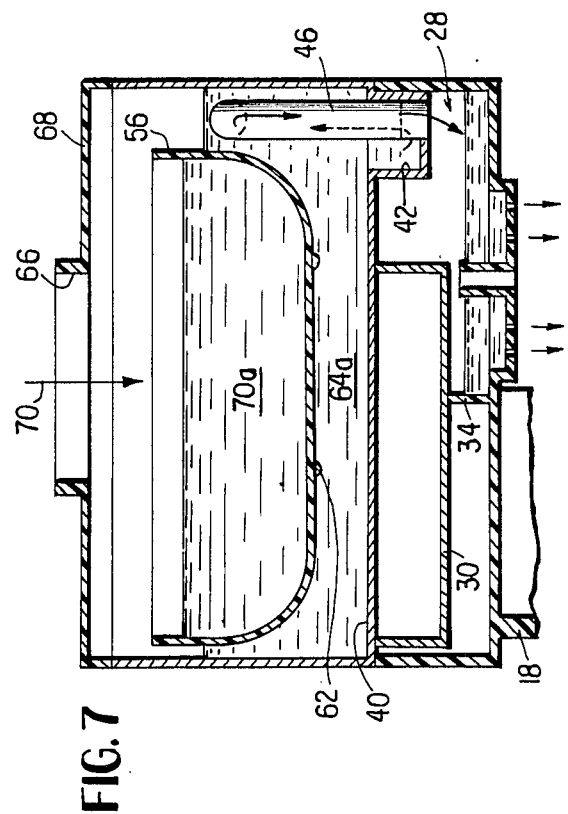

To make coffee, a second inpour of cold water 70 is added to buoyant tank 56 whereupon the same starts to sink under the weight of the added body of cold water 70a (FIG. 7). The submergence of tank 56 raises the level of the first body of now heated water 64a above the level of the siphon bight 54 thus starting a siphon of heated water 64a from tank 12 to transfer tank 28 from which it passes via spray head 24 to coffee grounds in filter basket 20. An overflow stand pipe 72 associated with spray head 24 limits the depth to which the water level in transfer tank 28 may rise to limit the head pressure across spray head 24. FIG. 8 illustrates the siphoning action just prior to the emptying of tank 12. As the level of heated water 64a continues to fall and the only remaining water is in well 42 the rate of fall increases many fold to fall rapidly below the lower end 53 of the relatively small diameter siphon breaker 52 thus providing a fully open vent to bight 54 so that when the lowering water level reaches the lower end 50 of the siphon tube, the remaining water in both legs falls by gravity providing an immediate siphon cut off.

All the first body of water 64a has now passed to the transfer tank and the position of the buoyant tank is as shown in FIG. 5. Over the next few minutes the water in buoyant tank 56 will flow into holding tank 12, via opening 58, to refloat the emptying tank 56 as illustrated in FIG. 6 whereupon another brew cycle may be commenced.

As will be apparent, holding tank 12 is removably supported by three lugs 74 integral with transfer tank assembly 14 and thus may be readily removed by lifting upwardly.

I claim:

1. In combination with a coffee maker having a filter basket in spaced, overlying relation to a coffee pot support, the improvement comprising:
   a water holding tank;
   a buoyant water transfer tank within said holding tank;
   means for introducing cold water to said holding tank via said transfer tank;
   said means comprising metering means;
   heating means for heating water in said holding tank; and
   means for transferring hot water from said holding tank to said filter basket as a function of cold water inpour to said transfer tank.

2. A method of making coffee, comprising:
   heating a first body of water to coffee brewing temperature in a holding tank;
   floating a buoyant transfer tank in said body of water within said holding tank;
   adding cold water to said transfer tank and raising the level of said first body of water;
   transferring substantially all said body of water to basket contained coffee grounds;
   metering cold water from said transfer tank to said holding tank to constitute a second body of water therein;
   refloating said transfer tank in said second body of water; and
   heating said second body of water preparatory to making additional coffee.

3. In a coffee maker including a holding tank within which water may be heated and normally maintained at a predetermined brewing temperature; a filter basket; siphon means for the flow of water from said holding tank to said filter basket on displacement of water within said holding tank; and a transfer tank disposed in said holding tank for receiving water as introduced to within said holding tank, said transfer tank having metering means for voiding water from said transfer tank to said holding tank following displacement of water from said holding tank and being of sufficient buoyancy to substantially float on water as normally maintained in said holding tank, and, on introduction of water thereinto, to sink into the water in said holding tank and thereby displace water from said holding tank to said siphon means.

4. A coffee maker as specified in claim 3 wherein said siphon means comprises a U-shaped siphon tube having a discharge end to communicate water therefrom to said filter basket, an inlet end disposed within and adjacent the bottom of said holding tank, and a bight portion positioned to extend above the level of water as normally maintained in said holding tank.

5. A coffee maker as specified in claim 4 wherein said siphon means includes a siphon breaker tube having an upper end in open communication with said siphon tube adjacent said bight portion thereof and a lower end which terminates above the inlet end of said siphon tube.

6. A coffee maker as specified in claim 3 wherein said holding tank includes a well portion dependent below the base thereof, and said siphon means comprises a U-shaped siphon tube having a discharge end opening through the base of said well to communicate water therefrom to said filter basket, an inlet end disposed within said well and opening thereinto below the base of said holding tank and above the base of said well, and a bight portion positioned to extend above the level of water as normally maintained in said holding tank.

7. A coffee maker as specified in claim 6 wherein said siphon means includes a siphon breaker tube having an upper end in open communication with said siphon tube adjacent said bight portion thereof and a lower end which terminates above the inlet end of said siphon tube.

8. The method of displacing preheated water from the holding tank of a coffee maker which consists in substantially floating a buoyant transfer tank on water as normally maintained at preheated coffee brewing temperature in the holding tank, and adding water to the transfer tank to sink the same into the water as normally maintained within the holding tank and thereby displacing water from the holding tank.

9. The method as specified in claim 8 and which includes the step of metering water from the transfer tank to the holding tank following displacement of water from the holding tank.

10. The method as specified in claim 9 and which includes the step of refloating the transfer tank on water within the holding tank as water is metered from the transfer tank to the holding tank.

11. The method as specified in claim 8 and which includes the step of siphon discharge of water from the holding tank as it is displaced therefrom.

12. The method as specified in claim 11 and which includes the step of breaking the siphon on discharge of substantially all of the water in the holding tank.

* * * * *